United States Patent [19]

Nelson et al.

[11] 4,456,626

[45] Jun. 26, 1984

[54] NEW SHORTENING SYSTEM

[75] Inventors: Kenneth W. Nelson; Ricky A. Woo; Patrick D. Palumbo; Michael L. Collins, all of Cincinnati, Ohio

[73] Assignee: The Procter & Gamble Company, Cincinnati, Ohio

[21] Appl. No.: 436,755

[22] Filed: Oct. 25, 1982

Related U.S. Application Data

[63] Continuation-in-part of Ser. No. 359,013, Mar. 17, 1982, abandoned.

[51] Int. Cl.³ .................... A21D 10/00; A21D 10/04; A21D 13/08; A23D 5/00
[52] U.S. Cl. .................................... 426/553; 426/554; 426/606
[58] Field of Search ................ 426/554, 553, 606, 612

[56] References Cited

U.S. PATENT DOCUMENTS

| | | | |
|---|---|---|---|
| 3,528,823 | 9/1970 | Rossen | 426/606 |
| 3,549,383 | 12/1970 | Menzies | 426/606 X |
| 3,751,265 | 8/1973 | Seiden | 426/606 X |

FOREIGN PATENT DOCUMENTS

| | | | |
|---|---|---|---|
| 698660 | 11/1964 | Canada | 426/606 |
| 1042261 | 11/1978 | Canada . | |

*Primary Examiner*—Robert A. Yoncoskie
*Attorney, Agent, or Firm*—Rose Ann Dabek; Nancy S. Mayer; Richard C. Witte

[57] ABSTRACT

A shortening for preparing moist, light and tender cakes is disclosed. The shortening comprises a fat or oil and an emulsifier which consists essentially of from about 10% to about 20% of propylene glycol mono-fatty acid esters and from about 3% to about 20% of hydrophilic polyglycerol ester (percentages are based on the weight in the shortening). The ratio of polyglycerol ester to propylene glycol monoester is about from about 2:1 to 7:1. This shortening system can be used in preparing baking mixes. Surprisingly, even in an add-oil preparation the cake is moist yet light and tender.

19 Claims, No Drawings

NEW SHORTENING SYSTEM

This is a continuation-in-part of application Ser. No. 359,013, of Kenneth W. Nelson and Ricky A. Woo, filed Mar. 17, 1982, now abandoned.

TECHNICAL FIELD

This invention relates to the field of shortenings and prepared cake mixes.

BACKGROUND OF PRIOR ART

The use of emulsifiers in fats and oils improves their performance in baking. In particular, they improve the aeration of the batter and enhance the formation of the homogeneous mixture of the batter. This produces a cake which is light and tender.

Added pudding or starches in a cake mix allows the preparer to increase the oil level in the batter. A moister cake is produced when the water and oil level are higher. Thus, two types of cake mixes have been developed. Those which contain pudding to which the consumer adds oil as well as water and egg to produce a dense, moist cake. The second type of dry mix is one in which the consumer adds only water (or milk) and eggs to produce a light, tender cake. Thus, the consumer has a choice of producing a moist, dense cake or a light, tender cake which is not as moist.

The shortening sytem of this invention comprises a system of emulsifiers composed of hydrophilic polyglycerol fatty acid esters and fatty acid monoesters of propylene glycol in an edible oil. The oil has a low solids content. When this shortening system is used in a dry culinary mix, that is, mixed with leavening, milk solids, egg solids, flavoring and coloring, as well as flour and sugar, a free-flowing granular mixture is prepared. When the consumer adds the liquid material such as water, milk and eggs to this mix, a batter is formed. Up to about one-half cup of additional oil can be added to the cake mix. The dry mix of this invention possesses improved tolerance under a variety of home baking conditions, and the cakes baked therefrom have improved eating quality, flavor release characteristics, moistness and yet are light and tender.

Surprisingly, the cakes prepared using the shortening of this invention possess the moistness of the added pudding cake mix yet the lightness and tenderness of the cakes without the added pudding or starches.

Even more surprising, this shortening system can be used in a white cake mix with added oil without modification. White cake mixes have less emulsifier in the batter because traditionally the yolk of the eggs are not added. Egg yolks contain natural emulsifiers. Therefore, dry mixes intended for white cakes usually require modification of all the ingredients, including the shortening. For white cakes without added oil, the polyglycerol ester must contain from about 3% to about 13% polyglycerol.

Therefore, it is an object of the present invention to produce a shortening system which enhances the formation of a homogeneous batter mixture and which can be used to produce a light, tender moist cake.

It is another object of this invention to produce a cake mix which produces a cake with the moistness of an added pudding cake and yet maintains both lightness and tenderness of the crumb.

It is also an object of this invention to produce a shortening system which can be used in white cake formulations without modification.

These and other objects of the invention will be obvious from the disclosures herein.

Unless otherwise specified herein, all percentages are by weight.

BRIEF SUMMARY OF THE INVENTION

A shortening system is disclosed which comprises of from about 13% to about 35% of an emulsifier, said emulsifier consisting essentially of a hydrophilic polyglycerol monoester and a propylene glycol monoester, wherein the fatty acids used to esterify the polyglycerol ester and propylene glycol esters have from about $C_{16}$–$C_{22}$ carbon atoms, the ratio of propylene glycol monoester to polyglycerol ester being from 2:1 to 7:1. The remainder of the shortening system is fats, oils or hydrogenated fats and oils. This shortening is used to prepare moist, light and tender cakes.

A culinary mix for preparing these cakes comprising from about 6% to about 17% shortening, sugar and flour, the sugar:flour ratio being from about 0.9:1 to about 1.7:1, and leavening is also disclosed.

The Shortening System

By "consisting essentially of" herein is meant that materials which do not adversely affect the composition can be present. This term does not encompass materials which will affect the functionality of the system.

By "shortening" or "shortening system" herein is meant a fat or oil or mixtures of fats and/or oils to which the emulsifiers have been added.

The fats or oils suitable for use herein can be plastic or fluid; however, a major portion of the shortening can be derived from naturally occurring liquid triglyceride oils such as cottonseed oil, soybean oil, peanut oil, rapeseed oil, sesame oil, coconut oil, corn oil, and sunflower seed oil. Also suitable are the liquid oil fractions obtained from palm oil, lard and tallow, as for example by graining or directed interesterification, followed by separation of the oils. Those predominating in glycerides of unsaturated fatty acids may require some hydrogenation to maintain flavor.

Mixture of the above oils or other oils can also be used herein as can solid fatty materials, such as saturated triglyceride fats. In general, from about 1.5% to about 25% of triglycerides which are solid at 70° F. can be added to a liquid oil.

Fish oils such as herring, menhaden and whale oil can also be used herein.

The preferred oils are soybean oil hydrogenated to an iodine value (IV) of from about 105 to 115, preferably about 107, corn oil, palm oil, hydrogenated palm oil, lard and tallow oils. Preferably the oils used to prepare the shortening composition will contain only from about 1% to about 7% hardstock. Hardstock is a hydrogenated triglyceride having an iodine value of 8 or less. Preferred hardstocks are hydrogenated soybean oil, hydrogenated cottonseed oil, hydrogenated palm oil and hydrogenated lard or tallow.

The emulsifier comprises about 13% to about 35% of the shortening system. The emulsifier consists of a propylene glycol monofatty acid ester and hydrophilic polyglycerol fatty acid ester in a ratio of from about 2:1 to about 7:1 (propylene glycol ester to polyglycerol ester).

The propylene glycol monoesters used herein are those esters of 1,2-propylene glycol and fatty acids having from about 14 to about 22 carbon atoms. Preferred propylene glycol monoesters are propylene glycol monopalmitate and propylene glycol monostearate.

The fatty acids used to esterify the propylene glycol can be saturated or trans-unsaturated carboxylic acid radicals having 14, 16, 18, 20 or 22 carbon atoms. A small amount of cis-unsaturated carboxylic acids can be present. Examples of suitable fatty acids are myristic, palmitic, margaric, stearic, arachidic, behenate, elaidic, and brassidic acids.

Commercial propylene glycol monoesters are prepared by transesterifying propylene glycol with a triglyceride, such as soybean or palm oil. The propylene glycol esters which result from this reaction will be predominantly propylene glycol monoesters. However, there will be propylene glycol diesters present (about 5%), as well as triglyceride materials (up to 30%). The amount of propylene glycol monoester present in the shortening compositions herein is calculated on the basis of the propylene glycol monoester present in the emulsifier. The contaminants in this composition do not affect the functionality of the shortening system.

The terms propylene glycol ester, propylene glycol monoester and propylene glycol fatty acid monoester are used interchangeably herein to identify the same material.

The hydrophilic polyglycerol esters have an average of four to nine glycerol units per polyglycerol moiety. Preferably, the polyglycerol esters will have an average of six glycerol units per polyglycerol moiety.

The polyglycerol can be prepared by any conventional method. Both acid catalyzed and base catalyzed polymerization products of glycerol will function as base materials for esterification. The polyglycerol is esterified with saturated fatty acids having from about 14 to about 22 carbon atoms. Preferably, the fatty acid will consist of a mixture of palmitic and stearic acids. The preferred ratio of palmitic to stearic acid is in the range of 2:3 to 7:3 ($C_{16}$:$C_{18}$). The hydrophilic, lipophilic balance of the polyglycerol ester is controlled by the ratio of polyglycerol to fatty acid reactant. This ratio can vary from 45:55 to 62:38. The preferred polyglycerol to fatty acid ratio is between 55:45 to 61:39. Polyglycerol esters with a polyglycerol to fatty acid ratio lower than 45:55 are too lipophilic which is detrimental to the eating quality of the cake. Polyglycerol to fatty acid ratios in excess of 62:38 have too high a free polyol level.

Preferably, the polyglycerol used to prepare the polyglycerol esters of this shortening system has the following distribution:

| Component | Percent |
| --- | --- |
| Free glycerol | 4.3–10.7 |
| Cyclic diglycerol | 6.7–9.9 |
| Linear diglycerol | 11.4–17.4 |
| Cyclic triglycerol | 3.7–6.9 |
| Linear triglycerol | 9.7–13.3 |
| Cyclic tetraglycerol | 2.5–4.2 |
| Linear tetraglycerol | 7.2–10.4 |
| Pentaglycerol | 8.9–11.3 |
| Hexaglycerol | 7.5–9.9 |
| Heptaglycerol | 6.1–8.1 |
| Octaglycerol | 4.8–6.4 |
| Nonaglycerol | 2.8–5.8 |
| Decaglycerol | 1.6–2.6 |
| Undecaglycerol | 0–3.1 |
| Dodecaglycerol | 0–0.8 |

The average of the chain length of these materials is about 6. The refractive index and hydroxyl value can also be used to characterize the distribution of the glycerol moieties within the polyglycerol. The preferred polyglycerol has a refractive index in the range of 90–99 (butyro scale units, 60° C.) and a hydroxyl value of 910–970. The higher the level of polymerization of the glycerol the higher the refractive index and the lower the hydroxyl value.

The refractive index is measured using a Zeiss refractometer at the specified temperature.

The hydroxyl value is defined as the milligrams (mg) of potassium hydroxide equivalent to the acetic acid consumed in acetylation of the hydroxyl groups of a one gram sample of the polyglycerol ester. The sample is acetylated by refluxing (114° C.) with excess acetic anhydride in pyridine. The excess acetic anhydride is hydrolyzed and titrated with alcoholic potassium hydroxide to the phenolphthalein end point.

When polyglycerols meeting the above requirements and esterified with fatty acids, the resulting polyglycerol esters should have a polyglycerol to fatty acid ratio within the range of that described above. The refractive index unit should be 50 to 65, and the hydroxyl values will generally be in the range of 350 to 470. The preferred method of esterification is by base catalyzed esterification using fatty acids. This method is illustrated in Example 1.

The free polyol (unesterified polyol) content in the hydrophilic polyglycerol ester is critical to the performance of the shortening system in a cake. Free polyol levels in the polyglycerol ester exceeding 13% can produce a smaller volume cake which is gummy, pasty and heavy. Polyols include free glycerine and polyglycerols such as diglycerol, triglycerol, tetraglycerol, etc.

The hydrophilic polyglycerol ester does not have to contain any free polyglycerol or polyol. However, for white cakes in which no added oil is present and no egg yolk is used to make the batter, the polyglycerol ester must contain from about 3% to about 13% polyol, preferably from about 7% to about 10% polyol is present.

To prepare the shortening system, the emulsifiers are melted and added to the oil or fat at a temperature above the melting point of the emulsifier to insure a homogeneous blend. The two emulsifiers are added to the fat or oil. The propylene glycol monoesters aid the blending of the polyglycerol esters and the free polyol to the shortening system.

Alternatively, the emulsifiers can be melted and added separately to the oils. The propylene glycol must be added first since it is necessary to solubilize or disperse the polyglycerol esters into the fat or oil.

If the hydrophilic polyglycerol ester has a polyol content in excess of the specified 13%, this excess polyol can be removed as follows. After the addition of the emulsifiers to the shortening system, the shortening is allowed to stand for several hours to allow the excess polyol in the hydrophilic polyglycerol esters to separate from the mixture. This layer of excess polyol is removed by centrifugation, decantation or other conventional means. Settling the shortening in this manner removes essentially all of the polyol.

If the polyol level of the polyglycerol ester is less than 13%, then the emulsifier can be co-mixed into the shortening system without a separate settling step.

The Culinary Mix

A culinary mix can be prepared from the shortening system comprising:

A. from about 70% to about 90% sugar and flour, the ratio of sugar:flour being from about 0.9:1 to about 1.7:1;
B. from about 1% to about 5% leavening;
C. from about 6% to about 15% shortening;
D. the balance being conventional cake additives.

The ordinary granulated sugars are quite satisfactory for use herein. These include sucrose, dextrose, maltose, fructose, lactose, brown and invert sugars, alone or in combination. The ratio of sugar to flour should be in the range of about 0.9:1 to about 1.7:1, preferably from about 1:1 to about 1.6:1.

The flour can be the usual bleached cake flour, although a general-purpose flour can be substituted. Flours which have been treated in other manners to produce flours of the quality of bleached cake flour are also acceptable. Flour can be enriched with additional vitamins and minerals.

The sugar and flour are preferably co-milled using the co-milling process described in commonly assigned U.S. Pat. No. 3,694,230 issued to Cooke, 1972, which disclosure is incorporated in its entirely by reference herein.

The leavening comprises a baking soda, for example sodium, potassium, or ammonium bicarbonate, and a baking acid, preferably sodium aluminum phosphate, monocalcium phosphate and dicalcium phosphate or mixtures thereof. Preferably, the amount of baking soda comprises from 0.75% to about 2.5% of the leavening system. The amount of sodium aluminum phosphate comprises from about 0% to about 1% of the total mix, the amount of dicalcium phosphate comprises from about 0% to about 1% of the total mix and the amount of monocalcium phosphate is from about 0% to about 1% of the total mix.

The selection of the leavening system is within the skill of one in the art. The ratio of the soda to the leavening acids will depend somewhat upon the flavor of the cake mix. Since the ratio of soda to acid controls the pH of the batter, the desired pH will depend upon the flavor of the cake.

The term "conventional cake additives" includes ingredients such as flavors, thickeners, nutrients, antioxidants, and antimicrobial agents, non-fat milk solids, egg solids, and whey proteins.

Suitable hydrophilic colloids can include natural gum materials such as gum tragacanth, locust bean gum, algin, gelatin, Irish moss, pectin, xanthan, guar gum and gum arabic. Synthetic gums such as water-soluble salts of carboxymethyl cellulose can also be used.

Non-fat milk solids which can be used herein are the solids of skim milk and can include proteins, mineral matter and milk sugar. Other proteins such as casein, sodium caseinate, calcium caseinate, modified casein, sweet dairy whey, modified whey, and whey protein concentrate can also be used herein. Generally these solids will be used from about 0% to about 5% of the weight of the dry mix.

For many culinary mixes it is accepted practice for the user to add the required amount of eggs in the course of preparation. If desired, the inclusion of egg solids, in particular egg albumin and dried yolk, in the mix are allowable alternatives. Soy isolates, whey protein concentrates, and other egg substitutes may be used in the place of the egg solids.

Dry or liquid flavoring agents can also be added to the mix. These include cocoa, vanilla, chocolate flavors, coconut, peppermint, pineapple, cherry, nuts, spices, salts, flavor enhancers, among others. Any suitable flavoring agent used to prepare baked goods can also be used herein.

To produce a cake mix, the shortening system is prepared as described in the preceding section. The flour, sugar, leavening agent, emulsified shortening, and additional ingredients are then mixed together in a conventional manner to produce the cake mix. For example, the emulsified shortening and other ingredients can be combined with the sugar, flour or a co-milled sugar/flour mixture by admixing these components in a planetary bowl mixer, a ribbon blender, a high-speed rotary mixer, or in other conventional mixers. Preferably, however, the shortening containing the emulsifier is first mixed with the sugar and flour mixture to form an essentially homogeneous sugar/flour/shortening blend. Then the additional ingredients are admixed with this blend.

To prepare a batter from this mix, the following ingredients are added: for an average 1040 g of batter, from 240 g to 360 g of water; from 90 g to 192 g of egg; from 0 g to 110 g of oil and from 500 g to 540 g of mix. For added oil cakes, which are usually a moister cake, from 55 g to 110 g of oil are added. The batter is then mixed to make a homogeneous blend and to incorporate air. This batter is then baked in a conventional oven at temperatures of from 325° F. to about 375° F. until done.

Combinations of polyglycerol esters and propylene glycol monoesters have been used in cake mixes before. Canadian Pat. No. 1,042,261 issued to P. Seiden (1978) discloses a shortening system having from 2% to about 10% by weight of polyglycerol esters, the polyglycerol esters having at least about 50% by weight linear di- and triglycerol, less than 6% by weight glycerol, and less than 12% by weight of polyglycerol containing 7 or more glycerol units. From about 27% to about 60% of the hydroxyl groups of the polyglycerol are esterified. The shortening also contains from 6% to 20% by weight of the monoester of an aliphatic diol having from 3 to 5 carbons, which includes propylene glycol monoesters. The remainder of the shortening is a triglyceride having an iodine value of more than 70 with a solids content index of less than 35 at 70° F.

Comparative cakes were made utilizing the shortening system of the Canadian patent (Cake A) and the shortening system herein (Cake B). The polyglycerol ester used to make Cake A had a hydroxyl value of 412, a saponification value of 106, and an average polyglycerol unit of 3. The polyglycerol ester used to make Cake B had a hydroxyl value of 415 and a saponification value of 100. The average polyglycerol unit was 6.

The following formulations were used:

| Ingredient | Cake A (%) | Cake B (%) |
|---|---|---|
| Shortening | | |
| PGE | 6* | 6.9** |
| Propylene glycol monoesters of palm oil | 14 | 16 |
| Soybean oil IV-107 | 77.5 | 66.95 |

-continued

|  | Cake A (%) | Cake B (%) |
| --- | --- | --- |
| Soybean oil IV-8 Mix | 2.5 | 3.35 |
| Shortening | 10.5 | 7.19 |
| Sugar | 44.99 | 48.84 |
| Flour | 39.99 | 39.87 |
| Salt | 0.75 | 0.75 |
| Leavening | 2.14 | 1.88 |
| Gums | 0.2 | 0.22 |
| Color, enrichments and flavors | 1.42 | 1.37 |

*polyglycerol ester of stearic acid with an average of 3 glycerol units
**polyglycerol ester of palmitic and stearic acid with an average of 6 glycerol units The sugar and flour are co-milled together using the method described in the Cooke et al. patent, U.S. Pat. No. 3,694,230 (1972). The shortening was prepared by mixing the propylene glycol monoester and the polyglycerol ester at a temperature of about 160° F. This mixture was then added to the remaining ingredients in the shortening. In the shortening of Cake B, the polyol was allowed to settle out and was separated. The shortening and co-milled sugar/flour were mixed together. To this mix was then added the remaining ingredients. Cake batters were prepared by using the following formulation:

|  | Cake A | Cake B |
| --- | --- | --- |
| Dry mix | 531 g | 524 g |
| Egg | 96 g | 144 g |
| Water | 320 g | 300 g |
| Oil | 0 | 73 g |
| Batter weight per layer | 463 g | 510 g |

Batters were prepared by mixing the above ingredients for two minutes using a standard home mixer at a medium speed. The batter was weighed into two 8-inch round pans. The cakes were baked to doneness; Cake A was baked for 32 minutes at 350+ F.; Cake B was baked for 37 minutes at 350° F.

|  | Cake A | Cake B |
| --- | --- | --- |
| Batter density | 0.76 g/cc | 0.74 g/cc |
| Viscosity (cps) | 3400 (68° F.) | 8000 (68° F.) |
| Center height (inches) | 2.26 (hot) | 2.54 (hot) |
|  | 2.12 (cold) | 2.36 (cold) |
| Edge height (inches) | 1.83 (hot) | 2.0 (hot) |
|  | 1.77 (cold) | 1.90 (cold) |

The increased viscosity of Cake B is an indication that a better batter emulsion was formed.

These cakes were taste-tested in a triangle taste test among 20 experienced cake testers. Cake B was preferred overall by 15 of the 20 panelists for moistness, for being less pasty and gummy and for better taste.

Another advantage of the shortening system herein is improved tolerance.

The unique shortening system provides equal tolerance to current cake mixes to which oil is not added. It has improved tolerance to the added pudding cakes which are the comercially available add-oil cakes. Improved tolerance means that in home use by the consumer cake mixes perform better and make acceptable cakes more often. Under a variety of conditions, i.e. undermeasurement of liquids, the use of portable or stationary mixers, under or over batter mixing time, higher or lower oven temperature, the consumer can achieve a cake of equal size and handling to the current commercial mixes which are non-add oil formulas, and improved cake size and handling to the add-oil pudding in the mix formulas currently commercially available. Texture preference, i.e. lightness and tenderness is superior for this cake against both types of these cakes made from the commercially available mixes.

The levels of the shortening are critical to the performance of the cake mix in producing the moistness attribute. Moistness is achieved in a cake by increasing the amount of water or oil. As water and oil is increased, cake performance is measured in terms of size of the cake and the texture.

The combination of emulsifiers in the specific ratios herein produces the proper batter emulsion. This allows more liquids to be added to the cake to enhance the moistness and yet maintain excellent cake properties.

Identical cake mixes were made using two shortening systems:

|  | C | D |
| --- | --- | --- |
| Base oil | 83.6% | 71.13% |
| Propylene glycol monoester | 10.4% | 13.8% |
| Hexapolyglycerol monoester | 4% | 6.9% |

Both cakes were made from the same ingredients and at the same mixing and baking times.

The C mix produced a good cake with up to a third cup of added oil. Cake mix D with an added one-half cup of oil still produced an excellent cake.

While the discussion herein has been primarily aimed at the value of the shortening in producing a moist, tender and light cake when used with added oil, it is possible to make a cake which is a little less moist yet which has the lightness and tenderness which consumers have come to expect in cake mixes of the non-pudding added type.

Method of Preparing Polyglycerol Esters

EXAMPLE I

Synthesis of a mixed ester of hexapolyglycerol

A reaction vessel, sufficient to hold 50 kg. of reactant, is used. The reaction vessel is fitted with a nitrogen sparge and a propeller mixer, is adapted to run under vacuum, and is also equipped with a condenser to collect the water removed during the reaction. To this vessel is added 27.67 kg. of polyglycerol having an average chain length of 6. The polyglycerol is mixed with 0.43 kg. of 50% sodium hydroxide. The reaction mixture is then heated to about 115° C. under full vacuum for about 15 minutes to remove the water from the sodium hydroxide polyglycerol mixture. Palmitic acid at a weight of 11.4 kg. (45.2 moles) and 6.12 kg. of stearic acid (21.5 moles) are added to the reaction mixture at atmospheric pressure. A partial vacuum is then pulled on the reaction vessel (about 508 mm of mercury) and the vessel heated to about 220° C. over the period of about an hour. The percent free fatty acid after an hour is about 6.3%. The vessel is then maintained at this partial pressure and at a temperature of about 230° C. for an additional 20 minutes when the free fatty acid drops to less than 0.3%.

The pressure is then lowered to about 12 mm of mercury and held there for about 15 minutes. This removes substantially all of the water from the reaction mixture.

The temperature is then maintained at about 224° C., the pressure maintained at 12 mm, and acid is added from the bottom. Over the period of about 5 minutes, 0.68 kg. of 75% phosphoric acid is added. The mixture is then cooled by using a water sparge and a 4.5° C. cooling coil to a temperature of about 157° C. over a period of about 7 minutes. During this cooling, the water distills out of the reaction mixture. The water sparge is then stopped, and the mixture cooled by the cooling coil to about 93° C. The product is an opaque liquid which solidifies on further cooling.

The total yield of the ester of the hexapolyglycerol is 40.6 kg. The weight of the distillate, including water collected during the reaction is 1.8 kg., approximately 0.9 kg. of this is water. The remainder is low molecular weight polyol. The saponification value is 98.74, and the hydroxyl value is 441.

EXAMPLE II

| Ingredient | Percent |
| --- | --- |
| Shortening | 9.14 |
| Sugar | 48.69 |
| Flour | 32.27 |
| Salt | 0.75 |
| Leavening | 1.78 |
| Gums | 0.33 |
| Starches | 2.17 |
| Enrichments, flavors, colors | 4.00 |

The shortening composition is:

| | |
| --- | --- |
| polyglycerol esters of stearic and palmitic acid (avg. 6) | 6.9 |
| propylene glycol monoesters | 18.9 |
| soybean oil (IV-107) | 66.95 |
| soybean oil (IV-8) | 3.35 |

The sugar and flour are co-milled together using the method described in the Cooke et al. patent, U.S. Pat. No. 3,694,230 (1972). The shortening was prepared by mixing the propylene glycol monoester and the polyglycerol ester at a temperature of about 160° F. This mixture was then added to the remaining ingredients in the shortening. The polyol was allowed to settle out and was separated.

The shortening and co-milled sugar/flour were mixed together. To this mix was then added the remaining ingredients. Cake batters were prepared by using the following formulation:

| | |
| --- | --- |
| Dry mix | 524 g |
| Egg | 144 g |
| Water | 300 g |
| Oil | 73 g |
| Batter weight per layer | 510 g |

Batters are prepared by mixing the above ingredients for two minutes using a standard home mixer at a medium speed. The batter is weighed into two 8-inch round pans. The layers are baked to doneness; about 37 minutes at 350° F.

A moist, light tasting cake is produced.

When pudding is added to this formula to make an added pudding cake, the cake is still moist but somewhat heavier in texture.

EXAMPLE III

| Ingredient | Percent |
| --- | --- |
| Shortening | 9.14 |
| Sugar | 48.69 |
| Flour | 32.27 |
| Salt | 0.75 |
| Leavening | 1.78 |
| Gums | 0.33 |
| Starches | 2.17 |
| Enrichments, flavors, colors | 4.00 |

The shortening composition is:

| | |
| --- | --- |
| polyglycerol esters of stearic acid palmitic acid (avg. 6) | 6.9 |
| propylene glycol monoesters | 18.9 |
| soybean oil (IV-107) | 66.95 |
| soybean oil (IV-8) | 3.35 |

The sugar and flour are co-milled together using the method described in the Cooke et al. patent, U.S. Pat. No. 3,694,230 (1972). The shortening is prepared by mixing the propylene glycol monoester and the polyglycerol ester at a temperature of about 160° F. This mixture is then added to the remaining ingredients in the shortening.

The polyol is allowed to settle out and is separated for the preparation of Cake R. The polyol is not separated from the shortening used to prepare Cake S. The polyol content of the polyglycerol ester used for Cake S is between 3% and 13%.

The shortening and co-milled sugar and flour are mixed together. To this mix is then added the remaining ingredients. Cake batters are prepared using the following formulations:

| Ingredients | Cake R | Cake S |
| --- | --- | --- |
| Dry mix | 524 g. | 524 g. |
| Egg white | 90 g. | 90 g. |
| Water | 300 g. | 300 g. |
| Batter weight | 447 g. | 447 g. |

Batters are prepared by mixing the above ingredients for two minutes using a standard home mixer at medium speed. Batter is weighed into two 8-inch round pans. The layers are baked to doneness at 350° F. for about 29 minutes.

Cake R has a hot center height of 1.26 and an edge measurement of 1.33. Cake S which contained polyol in the polyglycerol ester has a cake height in the center of 2.00 and an edge height of 1.65. The center to edge height of Cake R indicates that the structure is collapsed since the center height is lower than the edge height.

The same cake mixes are used to prepare a batter containing oil. 73 grams of oil are added to the mixes used to prepare Cakes R and S. Batter weight was 484 grams in an 8-inch round pan and the cakes are baked for 34 minutes at 350° F. A moist, light, tasty cake was produced from both mixes.

The cake prepared from the mix in which the polyglycerol ester has little or no polyol has a center height of 2.08 and an edge height of 1.72. The cake prepared from the polyglycerol ester containing less than 13% polyol has a cake height of 2.16 and an edge height of 1.78.

What is claimed is:

1. A shortening system comprising:
   (1) from about 13% to about 35% of an emulsifier consisting essentially of hydrophilic polyglycerol esters having an average of 4 to 9 glycerol units per polyglycerol moiety and from about 3% to about 13% polyol and propylene glycol monoesters in a ratio of polyglycerol ester to propylene glycol ester of from 1:2 to about 1:7;
   (2) from about 65% to about 80% of fat, oil or mixtures thereof.

2. A shortening system according to claim 1 wherein said shortening consists essentially of:
   (1) from about 10% to about 20% of propylene glycol monoester and from about 3% to about 20% of hydrophilic polyglycerol esters;
   (2) from about 65% to about 75% of an edible oil having from about 1.5% to about 25% solids at 70° F.

3. A shortening system according to claim 2 wherein said hydrophilic polyglycerol ester has from about 7% to about 10% polyol.

4. A shortening system according to claim 2 wherein the edible oil has an iodine value of from 100 to about 115.

5. A shortening system according to claim 4 wherein the propylene glycol monoesters are selected from the group consisting of propylene glycol monopalmitate and propylene glycol monostearate or mixtures thereof.

6. A shortening system according to claim 5 wherein the hydrophilic polyglycerol esters are selected from mixtures of palmitic and stearic acid esters of polyglycerols having an average of 6 glycerol units per polyglycerol moiety.

7. A shortening system according to claim 5 wherein the edible oil is soybean oil having an iodine value of about 107.

8. A shortening system according to claim 6 wherein the edible oil is soybean oil having an iodine value of about 107.

9. A shortening system according to claim 7 wherein the edible oil contains from about 1% to about 7% hardstock.

10. A shortening system according to claim 8 wherein the edible oil contains from about 1% to about 7% hardstock.

11. A dry culinary mix comprising
    (a) from about 40% to about 55% sugar and from about 30% to about 45% flour, the ratio of sugar to flour being from about 0.9:1 to about 1.7:1;
    (b) from about 1% to about 5% leavening;
    (c) from about 6% to about 15% of the shortening of claim 1;
    (d) the balance being conventional cake additives.

12. A mix according to claim 11 wherein the sugar to flour ratio is from about 1:1 to about 1.6:1.

13. A mix according to claim 12 wherein the shortening is the shortening of claim 2.

14. A mix according to claim 12 wherein the shortening is the shortening of claim 5.

15. A mix according to claim 14 wherein the shortening is the shortening of claim 6.

16. A mix according to claim 12 wherein the shortening is the shortening of claim 9.

17. A cake batter comprising:
    (a) 2.5% to 8% of the shortening of claim 1;
    (b) 33% to 41% sugar and flour in a ratio of from 0.9:1 to 1.7:1;
    (c) from about 0.4% to about 15% leavening;
    (d) from about 23% to about 35% water;
    (e) from about 8% to about 18% egg;
    (f) from about 0% to about 10.5% oil;
    (g) remainder being conventional cake additives.

18. A cake batter according to claim 17 wherein said oil is present from about 5% to about 10.5% of the batter.

19. A cake prepared by baking the batter of claim 17.

* * * * *